United States Patent Office 3,117,093
Patented Jan. 7, 1964

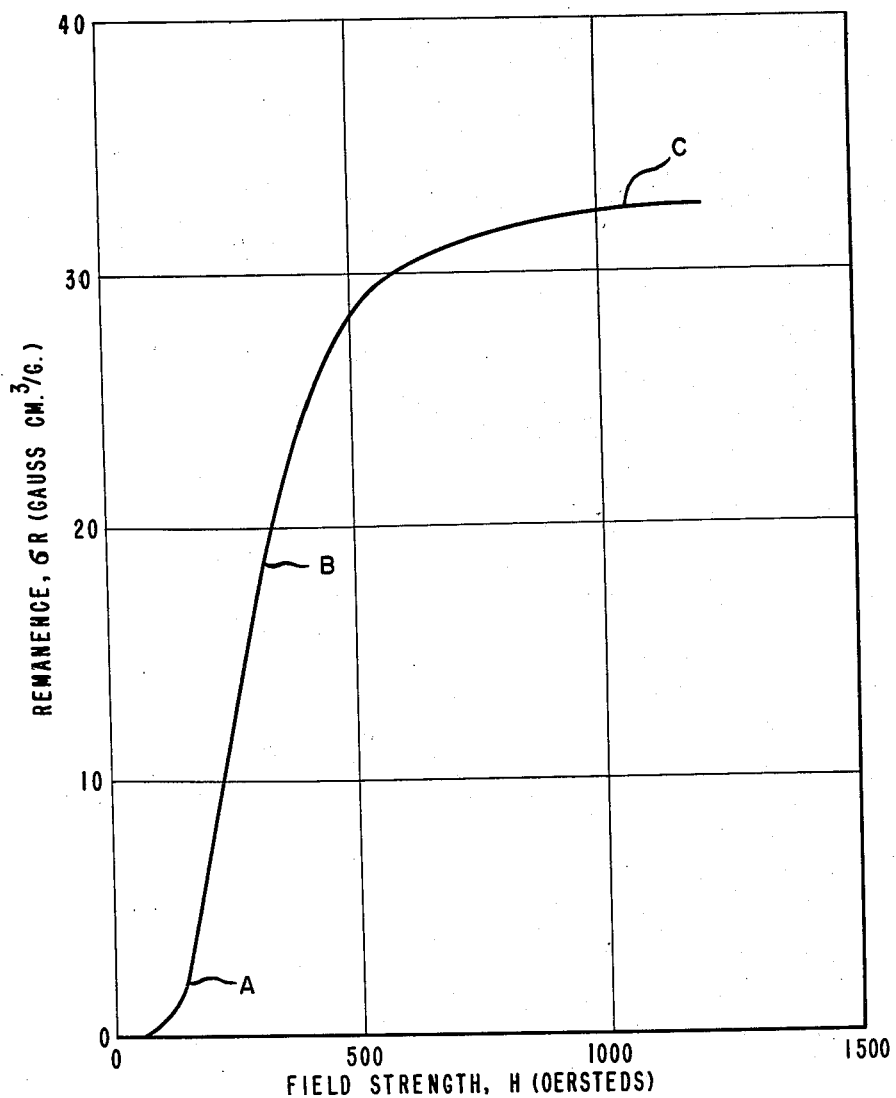
INVENTORS
PAUL ARTHUR, JR.
JOHN N. INGRAHAM

3,117,093
PROCESS FOR THE PREPARATION OF FERRO-
MAGNETIC CHROMIUM DIOXIDE
Paul Arthur, Jr., and John N. Ingraham, Wilmington,
Del., assignors to E. I. du Pont de Nemours and Com-
pany, Wilmington, Del., a corporation of Delaware
Filed Oct. 24, 1960, Ser. No. 64,626
10 Claims. (Cl. 252—62.5)

This invention relates to a novel process for the preparation of ferromagnetic chromium dioxide.

Recently processes have been described for the preparation of ferromagnetic chromium dioxide by thermal treatment of chromium trioxide in the presence of aqueous media. These processes provide ferromagnetic chromium dioxide in a variety of forms possessing a wide range of magnetic properties. However, such products have tended to be heterogeneous in particle size, a condition which has hindered realization of optimum properties in such applications as magnetic recording members.

The present invention provides a readily controlled process for the preparation of ferromagnetic chromium dioxide of improved homogeneity. This process consists in heating under hydrothermal conditions an insoluble oxide of chromium in which the average valence of the chromium is above 4 and below 6 to a temperature of 250–500° C. under a pressure ranging from 50–3000 atmospheres or more.

The chromium oxides employed as starting materials in this process may be represented by the formula $Cr_xO_y$, where $x$ and $y$ are positive integers such that the ratio $2y/x$ is greater than 4 and less than 6. These chromium oxides are less soluble in water than chromium trioxide and this property contributes to the efficacy of the present process in producing a superior product. Oxides in which $2y/x$ is less than 5.5 are preferred since they exhibit lower water-solubility than oxides in which the ratio is above 5.5.

From the foregoing, it will be apparent that oxides of chromium, $Cr_xO_y$, in which $2y/x$ falls between 4.0 and 5.5 represent a preferred class of starting materials. Within this range the chromium oxides $Cr_3O_8$ and $Cr_2O_5$ in which the average valence of chromium is 5.33 and 5.00, respectively, and oxides prepared by thermal decomposition of chromic nitrate, in which the average valence of chromium is 4.1–5.0, represent especially useful starting materials. When these oxides or their mixtures are employed, ferromagnetic chromium dioxide is produced in the form of a finely particulate powder which is highly uniform with respect to particle size and magnetic properties. By use of oxides in which the average chromium valence is 5 or below, unmodified ferromagnetic chromium dioxide with coercive force of 200 oersteds and above can be prepared readily.

The temperature and pressure at which conversion of the chromium oxide, $Cr_xO_y$, to ferromagnetic chromium dioxide is carried out are interrelated and in general the higher the temperature within the operable range the higher the pressure required for optimum results. Although pressures of 3000 atmospheres or more can be employed, lower pressures are preferred since they permit the use of simpler equipment and do not affect the properties of the ferromagnetic chromium dioxide produced adversely. The pressure will usually be below 1000 atmospheres and is preferably below about 800 atmospheres. When such pressures are employed, reaction temperature is preferably in the range of 330–400° C. As illustrated in the examples, pressures in the neighborhood of the critical pressure of water and higher pressures are often employed.

The reaction conditions are usually maintained for 1–10 hours although longer or shorter times may sometimes be usefully employed.

The thermal conversion of chromium oxide, $Cr_xO_y$, to ferromagnetic dioxide is carried out in water or aqueous acid as reaction medium. The mineral acid, nitric acid, has been found to be very desirable as an acid medium. Although the quantity of medium may range up to about six times the weight of $Cr_xO_y$ employed, quantities in the range of 0.1–1.5 parts by weight per part of $Cr_xO_y$ are usually used. It is particularly noteworthy that even when relatively small proportions of medium are employed, i.e., proportions of about 0.1–0.2 parts per part of $Cr_xO_y$, the product is obtained in the form of a fluid slurry which is readily stirred and handled. In the preparation of unmodified high coercive force ferromagnetic chromium dioxides as described above, the quantity of medium should not exceed about 50% (by weight based on $Cr_xO_y$).

Various modifying agents may be used in the process of this invention. Examples of modifying agents are found in U.S. Patents 2,885,365, 2,923,683, 2,923,684 and 2,923,685. Particularly useful additives include antimony sesquioxide, ruthenium dioxide, alkali metal sulfates, tin sulfate or sulfide, and iron oxide. The additives may be incorporated in the reaction mixture during conversion of the oxide $Cr_xO_y$ to ferromagnetic chromium dioxide, to facilitate the reaction or to modify the magnetic properties of the product or for a combination of these purposes. By use of additives, the range within which magnetic properties of the product, such as coercive force, remanence ratio and Curie temperature, can be varied is substantially increased.

The amount of modifier used will vary from a minimum of 0.008% by weight in the case of ruthenium to a maximum of 25% in the case of antimony. The preferred amounts by weight of modifier in the ferromagnetic chromium dioxide are: for antimony, 0.05–25%, preferably 0.05–15%; for ruthenium, 0.008–4.4%; for the alkali metals, 0.03–1.0%; and for iron 0.1–14%.

It will be apparent that the additives can be incorporated during the preparation of the chromium oxide, $Cr_xO_y$, if desired, instead of during the conversion of this oxide to ferromagnetic chromium dioxide. Incorporation of the additives during preparation of $Cr_xO_y$ provides a ready means for producing a homogeneous composition in which the additive is uniformly distributed throughout.

The oxides of chromium, $Cr_xO_y$, employed as starting materials in the process of this invention can be obtained, for example, by heating chromium trioxide in oxygen or air at atmospheric pressure to a temperature within the range of 150–380° C. for a period ranging from several hours to several days. Thus, oxide prepared by heating chromium trioxide at 250° C. in oxygen for 2–5 days or at 290° C. for 2 days exhibited an average chromium valence of 5.2–5.3 and was shown by X-ray analysis to be composed essentially of $Cr_3O_8$. Shorter heating periods may also be employed. Oxide containing essentially $Cr_2O_5$ was prepared in a similar manner by heating chromium trioxide at a temperature of 360° C. for 8–24 hours.

Oxides suitable for use as starting material in the process of this invention can also be prepared by thermal decomposition of a chromium nitrate, e.g., chromic nitrate nonahydrate. This thermal decomposition is carried out by heating the hydrated salt at substantially atmospheric pressure to a temperature in the range of 150–380° C. During this heating, water and oxides of nitrogen are driven off and the chromium is oxidized from a valence of 3 to an average valence above 4, usually between 4.1 and 5.0. Heating is usually continued until evolution of water and nitrogen oxides has ceased or has become very slow. Depending on the temperature employed, this usually requires a period of a few minutes, i.e., 10 minutes, to several hours.

The oxide $Cr_xO_y$ prepared by the methods described above is a black or brownish-black mass which can be crushed readily and pulverized by grinding in a mortar or by ball-milling. It is desirably reduced to a finely divided state, i.e., to a particle size of less than 10 microns, preferably less than 2 microns, before conversion to ferromagnetic chromium dioxide. After grinding or ball-milling, the $Cr_xO_y$ may be washed with water, if desired, to remove any water-soluble material that may be present. Such treatment may further reduce the particle size so that the ferromagnetic chromium dioxide eventually produced is in the form of extremely fine needles. Sometimes grinding and washing can be combined conveniently by ball-milling the $Cr_xO_y$ in aqueous suspension and immediately filtering the product. Any additives to be employed during conversion to ferromagnetic chromium dioxide may be introduced during the grinding or ball-milling.

In one method for conversion to ferromagnetic chromium dioxide, the chromium oxide $Cr_xO_y$ containing modifying agents, if desired, is placed in a platinum tube together with the desired quantity of medium. The tube is sealed and then subjected to the conditions of temperature and pressure selected. At the end of the desired reaction time, the sealed tube is cooled and opened, the contents removed and the solid product separated by filtration and dried. The product is a dark gray or black strongly magnetic chromium dioxide in the form of very uniform small particles composed entirely of a tetragonal crystal structure, ranging from 0.02–2 microns in length and having a ratio of length to transverse dimension (axial ratio) in the range of 3:1 to 20:1 or higher. These particles also exhibit great uniformity in magnetic properties. In the best products the particles range from about 0.1–1.0 micron in length and from about 0.02–0.1 micron in transverse dimension. Axial ratios of such products are in the range of 3–10.

By using a chromium oxide, $Cr_xO_y$, in which the average chromium valence is 5 or below in the process of this invention, products exhibiting high intrinsic coercive force can be produced without the introduction of an additive, such as ruthenium dioxide or antimony sesquioxide. As a result, such products possess higher sigma values, $\sigma_s$, than products of equivalent intrinsic coercive force prepared by earlier methods requiring the presence of such modifiers. Because of their improved homogeneity and excellent magnetic properties, these products are particularly useful in the preparation of magnetic recording members.

A particularly significant feature of chromium dioxide prepared as described above from $Cr_xO_y$ is indicated by the excellent slope and linearity characteristics of the remanence curve obtained by plotting remanence, $\sigma_r$, as a function of field strength, H. In magnetic recording members, the abruptness or steepness of the remanence curve is related to high frequency response, while the length of the linear region of the curve determines in part the output attainable for a given distortion. These quality features cannot be present in the finished recording member unless they be present in the magnetic component thereof.

In ferromagnetic chromium dioxide of the present invention, the desirable slope and linearity of the remanence curve are enhanced by the great uniformity in particle size and shape exhibited by these products. As illustrated in the examples, these products are composed of particles having an average length of not more than about 2 microns and in most instances not more than about 0.5 micron. A factor contributing to this uniformity in particle dimensions is believed to be the insolubility of the oxide, $Cr_xO_y$, which is soluble to an extent of less than 5% by weight measured in water at 25° C.

The best products are obtained when an oxide, $Cr_xO_y$, having a solubility less than 1% is employed.

Magnetic properties which are particularly important and which render these products useful in a variety of applications are the intrinsic coercive force, $H_{ci}$, the saturation per gram or sigma value, $\sigma_s$, and the remanence ratio, $\sigma_r/\sigma_s$, i.e., the ratio of the retentivity or remanence per gram to the saturation per gram. Retentivity and saturation are defined on pp. 5–8 of Bozorth's "Ferromagnetism," D. Van Nostrand & Co., New York (1951). The sigma values given herein are determined in a 4000 gauss field on apparatus similar to that described by T. R. Bardell on pp. 226–228 of "Magnetic Materials in the Electrical Industry," Philosophical Library, New York (1955). The definition of intrinsic coercive force, $H_{ci}$, is given in Special Technical Publication No. 85 of the American Society for Testing Materials entitled 'Symposium of Magnetic Testing" (1948), pp. 191–198. The values for intrinsic coercive force given herein are determined on a D.C. ballistic-type apparatus which is a modified form of the apparatus described by Davis and Hartenheim in the Review of Scientific Instruments 7, 147 (1936).

As indicated above, the linearity and slope of the remanence curve are also important properties of these products. The method of determining these properties is described with reference to the drawing, which represents the curve obtained for the product of Example X–C. Linearity is defined as the ratio, expressed as a percentage, of the intercept of the linear portion of the curve on the remanence axis to the corresponding intercept of the entire curve. In the drawing the straight portion lies between points A and B and point C indicates the maximum remanence of the product. Linearity is:

$$\frac{\sigma_r(B) - \sigma_r(A)}{\sigma_r(C)} \times 100$$

or specifically for the product of Example X–C:

$$\frac{18.4 - 2.0}{32.6} \times 100 = 50\%$$

The slope of the $\sigma_r$ v. H curve is expressed as the ratio of the intercept on the remanence axis of the portion of the curve between points A and B to the intercept of the same portion of the curve on the field strength axis, i.e., the slope is:

$$\frac{\sigma_r(B) - \sigma_r(A)}{H(B) - H(A)}$$

For the product of Example X–C, this becomes $$\frac{18.4 - 2.0}{310 - 140} = 0.097 \text{ gauss cm.}^3/\text{g. oe.}$$

The process of this invention is illustrated by the following examples in which quantities are expressed in parts by weight, except as otherwise indicated.

EXAMPLE I

A. A chromium oxide, $Cr_xO_y$, containing $Cr_3O_8$ as the predominant crystalline phase was prepared by heating chromium trioxide at 250° C. in an atmosphere of oxygen for 5 days at atmospheric pressure. The resulting black product was ball-milled with four times its weight of water for 30 minutes, filtered, and the solid washed on the filter four times with water. The washed material was allowed to air-dry and was pulverized in an agate mortar.

The oxide prepared as described above (4 g.) was ball-milled in the dry state with 0.5% (by weight based on $Cr_xO_y$) antimony sesquioxide for 30 minutes in a 100 cc. agate ball-mill. This mixture and 27.5% water were placed in a platinum tube which was then sealed. The tube and contents were heated to 330° C. under a pressure of 200 atmospheres for a period of 8 hours. After cooling to room temperature, the pressure was released, the platinum tube opened, and the black product was washed with water and air-dried. It was ferromagnetic chromium dioxide having an intrinsic coercive force, $H_{ci}$, of 360 oersteds, a sigma value, $\sigma_s$, of 73 gauss cm.$^3$/g., and a remanence ratio $\sigma_r/\sigma_s$ of 0.40. This product consisted of acicular particles less than 0.3 micron in length.

B. An antimony-modified oxide of chromium consisting predominantly of $Cr_3O_8$ was prepared by heating chromium trioxide with 1% (by weight based on chromium trioxide) of $Sb_2O_3$ at 300–306° C. for 3 hours under a pressure of 1300–1470 atmospheres of carbon dioxide. The product, a weakly magnetic, brownish black solid, was shown by X-ray to consist of $Cr_3O_8$ together with other oxides of chromium in small amounts.

The above product was heated with water (17% by weight based on the product) in a sealed platinum tube at 400° C. under 750 atmospheres pressure for 3 hours. On opening the tube, a dark gray strongly magnetic solid was obtained having an intrinsic coercive force of 153 oersteds, a sigma value, $\sigma_s$, of 75 gauss cm.$^3$/g. and a remanence ratio, $\sigma_r/\sigma_s$ of 0.36.

EXAMPLES II–VI

These examples further illustrate the conversion of a $Cr_xO_y$ composed predominantly of $Cr_3O_8$ to ferromagnetic chromium dioxide. The oxide, $Cr_xO_y$, used in these examples was prepared as described in Example I with the following exceptions: the starting material for Example III was washed with water by decantation over a period of 2 days rather than by ball-milling, and the starting material for Example IV was employed without water-washing. The desired quantity of additive was mixed with the starting material by dry-grinding. The identity and amount of additive employed and the proportion of water used as medium are indicated in Table I below. Hydrothermal conversion to ferromagnetic chromium dioxide was carried out in sealed platinum tubes as described in Example I at a temperature of 450° C. under a pressure of 750 atmospheres for 3 hours. The characteristics of the products obtained are also shown in Table I.

*Table I*

CONVERSION OF $Cr_xO_y$ TO FERROMAGNETIC CHROMIUM DIOXIDE

| Example No. | Other Ingredients (percent) [1] | | Product characteristics | | | |
|---|---|---|---|---|---|---|
| | Additive | Water | $H_{ci}$ (oersteds) | $\sigma_s$ (gauss cm.$^3$/g.) | $\sigma_r/\sigma_s$ | Maximum Particle Length ($\mu$) |
| II | $Sb_2O_3$ (0.25) | 27.5 | 412 | 77 | 0.43 | 0.3 |
| III | $Sb_2O_3$ (0.5) | 20.0 | 420 | 78 | 0.47 | 0.3 |
| IV | $Sb_2O_3$ (0.5) | 27.5 | 360 | 80 | 0.42 | 2.0 |
| V | $Sb_2O_3$ (0.5) | 27.5 | 405 | 75 | 0.43 | 0.3 |
| VI | $RuO_2 \cdot H_2O$ (0.6) | 27.5 | 220 | 78 | 0.34 | 0.3 |

[1] By weight based on chromium oxide, $Cr_xO_y$.

EXAMPLES VII AND VIII

These examples illustrate the use of chromium oxide, $Cr_xO_x$, containing antimony sesquioxide, as modifier, incorporated during preparation of the starting material. Preparation of an oxide, which was predominantly $Cr_3O_8$, was carried out by heating chromium trioxide with 0.5% (by weight) antimony sesquioxide at 250° C. in an atmosphere of oxygen for a peirod of 5 days (Example VII) or 2 days (Example VIII). The modified oxide for Example VII was washed with water as described in Example III above; that for Example VIII was not water-washed. Conversion to ferromagnetic chromium dioxide was carried out at 450° C. under a pressure of 750 atmospheres for 3 hours as described above. The proportions of water employed during conversion to ferromagnetic chromium dioxide and the properties of the products are shown in Table II.

*Table II*

CONVERSION OF MODIFIED $Cr_xO_y$ TO FERROMAGNETIC CHROMIUM DIOXIDE

| Example No. | Other Ingredient Water (percent) [1] | Product Characteristics | | | |
|---|---|---|---|---|---|
| | | $H_{ci}$ (oersteds) | $\sigma_s$ (gauss cm.$^3$/g.) | $\sigma_r/\sigma_s$ | Maximum Particle Length ($\mu$) |
| VII | 24.4 | 405 | 77 | 0.40 | [2] 0.5 |
| VIII | 27.5 | 420 | 74 | 0.48 | 1.5 |

[1] By weight based on modified $Cr_xO_y$.
[2] A few particles ranged up to 1.0$\mu$ in length.

EXAMPLE IX

A modified chromium oxide, $Cr_xO_y$, containing $Cr_3O_8$ as the major component was prepared by heating chromium trioxide with 0.25% (by weight, based on chromium trioxide) antimony sesquioxide and 0.25% $\alpha$-ferric oxide for a period of 2 days in a stream of oxygen at 250° C. The resulting mass was pulverized in an agate mortar, mixed with 40% water (based on the weight of $Cr_xO_y$), and converted to ferromagnetic chromium dioxide in a sealed platinum tube as described in Example I. The ferromagnetic chromium dioxide so obtained had an intrinsic coercive force of 420 oersteds, a sigma value, $\sigma_s$, of 78 gauss cm.$^3$/g., and a remanence ratio $\sigma_r/\sigma_s$ of 0.47. The $\sigma_r$ vs. H curve had a linearity of 34% and a slope of 0.075 gauss cm.$^3$/g. oe. This product was employed in the preparation of a high-quality magnetic recording member as described below.

A quantity (6.5 g.) of ferromagnetic chromium dioxide, prepared as described in the preceding paragraph, was milled in a centrifugal mill with 19.6 g. of distilled $\gamma$-butyrolactone for a period of 3.5 hours. An additional 15 g. of lactone was then added and grinding continued for 2 hours. The mixture was transferred to a bead-mill using 5 g. of lactone for rinsing and milled with 50 g. of ¼ inch diameter glass beads and 11.3 g. additional $\gamma$-butyrolactone. Milling was continued for a period of 19 hours, whereupon 2.42 g. of polyvinyl fluoride and 0.1 g. of dioctyl sodium sulfosuccinate was added and milling continued for an additional 4 hours.

The resultant dispersion of ferromagnetic chromium dioxide and polyvinyl fluoride was sand-milled three times through a 450-mesh screen (see, for example, U.S. Patents 2,581,414 and 2,855,156) and cast on a glass plate using a 7-mil doctor knife. The cast dispersion on the plate was passed once through the magnetic field produced by like poles of two bar magnets separated by a distance of ⅝ inch. (The field strength measured in a plane perpendicular to the axes of the magnets half way between them and three-quarters inch away from the edge of the pole faces was 465 oersteds.) The cast dispersion was then placed along the axis of a solenoid having a field strength of 1950 oersteds and coalesced while in the field by exposure for 65 seconds to heat from a heated glass panel at a distance of ½ inch. (Temperature measured by a thermocouple ⅛ inch below the panel was 380° C.) After coalescence, the magnetic field was removed and the coalesced film cooled and stripped from the glass panel. The retentivity $\sigma_r$ was determined on samples of film cut in the form of a square in a direction parallel to the direction of orientation of the magnetic particles and in the perpendicular direction. The ratio of these $\sigma_r$ values ($\sigma_r$ parallel/$\sigma_r$ perpendicular) was 0.91, indicating that excellent alignment of the ferromagnetic chromium dioxide particles in the recording member had been obtained. The output of this recording member was found to be equivalent to that of a commercial instrumentation tape.

EXAMPLE X

A chromium oxide, $Cr_xO_y$, shown by X-ray diffraction to consist predominantly of $Cr_2O_5$, was prepared by heating chromium trioxide at 250° C. for 2 days followed by heating at 360° C. for 1 day, both heatings being carried out in oxygen. The black product was crushed and pulverized by dry grinding in an agate ballmill.

A. Antimony sesquioxide (0.5% by weight based on $Cr_xO_y$) was introduced into the mill and milling continued for a period of 0.5 hour. The blended mixture was transferred to a platinum tube, 41.7% water (based on the weight of the mixture) was added, and the tube sealed. The tube and contents were heated at 400° C. under 750 atmospheres' pressure for a period of 3 hours. The product was a black acicular ferromagnetic chromium dioxide having an intrinsic coercive force, $H_{ci}$, of 465 oersteds, a sigma value, $\sigma_s$, of 83 gauss cm.$^3$/g., and a remanence ratio, $\sigma_r/\sigma_s$, of 0.47. The product was composed of acicular particles very uniform in size ranging in length from about 0.02 micron to about 0.7 micron, and in width from about 0.02 micron to 0.06 micron.

B. In another preparation, the chromium oxide, $Cr_xO_y$, described in the previous paragraph was heated with 0.5% (by weight based on $Cr_xO_y$) $Sb_2O_3$ and 40% water at 400° C. under a pressure of 200 atmospheres for 2 hours. The ferromagnetic chromium dioxide produced had an intrinsic coercive force, $H_{ci}$, of 530 oersteds, a sigma value, $\sigma_s$, of 81 gauss cm.$^3$/g., and a remanence ratio, $\sigma_r/\sigma_s$, of 0.49. The $\sigma_r$ vs. H curve had a linearity of 32% and a slope of 0.080 gauss cm.$^3$/g. oe.

C. In a further preparation, the chromium oxide, $Cr_xO_y$, described above was mixed with 38% water and heated at 360° C. under 1000 atmospheres pressure for 8 hours. The unmodified ferromagnetic chromium dioxide produced consisted of acicular particles less than ca. $0.8\mu$ in average length and had a coercive force, $H_{ci}$, of 183 oersteds, a sigma value, $\sigma_s$, of 90 gauss cm.$^3$/g., and a remanence ratio, $\sigma_r/\sigma_s$ of 0.37. The $\sigma_r$ vs. H curve as illustrated in FIGURE I had a linearity of 50% and a slope of 0.097 gauss cm.$^3$/g. oe. A recording member prepared from this product is described in Example XVII.

EXAMPLE XI

Chromic nitrate nonahydrate $Cr(NO_3)_3 \cdot 9H_2O$ was heated at atmospheric pressure in a stream of air at 280° C. for 1 hour. The product was a brownish-black nonmagnetic powder having an average chromium valence of 4.2–4.3. The product was ball-milled in an agate mill for 1 hour and used in preparation of ferromagnetic chromium oxide as described below. Antimony oxide was blended with the product by milling.

The above described brownish-black powder was sealed in a platinum tube with 100% water and 0.5% antimony sesquioxide and heated at 330° C. under a pressure of 200 atmospheres for 8 hours. The product was a black ferromagnetic chromium dioxide of high quality having an intrinsic coercive force, $H_{ci}$, of 390 oersteds, a sigma value, $\sigma_s$, of 80 gauss cm.$^3$/g., and a remanence ratio, $\sigma_r/\sigma_s$, of 0.47. This product consisted of fine particles averaging less than 0.5 micron in length.

In a further preparation, the brownish-black non-magnetic powder was mixed with 0.5% antimony sesquioxide (by ball-milling) and 28% water and heated in a sealed tube of heat-resistant glass to a temperature of 330° C. under a pressure of 120 atmospheres for 4 hours. The product consisted of black ferromagnetic chromium dioxide of small particle size (average particle length less than 0.5 micron) having an intrinsic coercive force, $H_{ci}$, of 400 oersteds, a sigma value, $\sigma_s$, of 76 gauss cm.$^3$/g. and a remanence ratio, $\sigma_r/\sigma_s$, of 0.46. The $\sigma_r$ vs. H curve had a linearity of 42% and a slope of 0.069 gauss cm.$^3$/g. oe. This product was employed in the preparation of a magnetic recording member as described in Example XII.

EXAMPLE XII

A dispersion of the above ferromagnetic chromium dioxide and polyvinyl fluoride in $\gamma$-butyrolactone was prepared by the general procedure described in Example IX. Centrifugal milling was continued for 2 hours and bead-milling for 2 days. The resulting dispersion, containing 20.4% total solids of which 75% was ferromagnetic chromium dioxide, was sand-milled three times through a 450-mesh screen, and cast on a glass plate with a 10-mil doctor knife. The cast dispersion on the plate was placed in an A.C.-D.C. magnetic field provided by a solenoid having two separate windings which, when individually activated, provided respectively, a D.C. field of about 2700 oersteds and an A.C. field of about 830 oersteds. While in the field, the cast dispersion was exposed at a distance of $\frac{7}{16}$ inch to a heated glass plate maintained at such a temperature that a thermocouple $\frac{1}{4}$ inch from the surface of the heated plate registered a temperature of 380° C. These conditions were maintained for 65 seconds whereupon the magnetic field was turned off and the coalesced film still supported on the plate was removed from the heated zone. The film was stripped from the plate and slit to $\frac{1}{4}$ inch width. Several lengths so obtained were spliced end to end to form a magnetic recording tape of sufficient length for testing.

The response of this magnetic tape was determined by a modification of the procedure given in Military Specification MIL-T-21029 using an Ampex No. 307 Tape Recorder which had been modified by replacing the equalized playback amplifier by a flat amplifier having a gain, uniform at all frequencies, of 40 db. Testing was carried out at a tape speed of 15 inches/second at maximum recording level under optimum bias conditions. Optimum bias is measured at a frequency of 5000 cycles/second and is the bias for which output is largest for an input of +4 db. Maximum recording level is defined as the level of a 1000 cycle/second input signal which produces 3% third harmonic distortion in the output under optimum bias conditions. The output of the tape, prepared as described above, under these conditions at an input of +21.7 db (maximum recording level) was −5.8 db and +12.2 db at 0.1 kc. and 1 kc., respectively. These values indicate excellent performance.

EXAMPLES XIII–XVI

These examples illustrate the preparation of ferromagnetic chromium dioxide of high quality from chromium oxide, $Cr_xO_y$, obtained by heating chromic nitrate nonahydrate at 330° C. for 2 hours. Conditions for the conversion of $Cr_xO_y$ to ferromagnetic chromium dioxide and the properties of the products are listed in Table III.

*Table III*

PREPARATION OF FERROMAGNETIC CHROMIUM DIOXIDE

| Example No. | Conditions of Conversion [1] | | | | Properties of Product | | |
|---|---|---|---|---|---|---|---|
| | Addition [2] | Medium [3] | Temp. (°C.) | Time (hrs.) | Intrinsic Coercive Force, $H_{ci}$ | Sigma Value $\sigma_s$ | Remanence Ratio $\sigma_r/\sigma_s$ |
| XIII | 0.5 | 100 | 330 | 8 | 473 | 85 | 0.47 |
| XIV | None | [4]None | 400 | 1 | 240 | 83 | 0.32 |
| XV | None | [5]28 | 400 | 1 | 240 | 84 | [6]0.35 |
| XVI | None | [7]None | 400 | 2 | 300 | 79 | 0.32 |

[1] A pressure of 200 atmospheres was employed.
[2] $Sb_2O_3$ (percent by weight based on $Cr_xO_y$) incorporated by ball-milling dry for 30 minutes.
[3] Water added (percent by weight based on $Cr_xO_y$).
[4] The oxide, $Cr_xO_y$, contained 3–5% moisture.
[5] The oxide, $Cr_xO_y$, was washed thoroughly with water, and air-dried to 9% moisture content.
[6] The $\sigma_r$ vs. H curve had a linearity of 55% and a slope of 0.075 gauss cm.$^3$/g. oe.
[7] The oxide, $Cr_xO_y$ was ball-milled for 1 hour with 400% (by weight based on $Cr_xO_y$) water.

EXAMPLES XVII–XVIII

Magnetic recording members were prepared from the products of Examples X–C and XVI by milling the products, after demagnetization in a 60-cycle A.C. field, in an agate mill with γ-butyrolactone and dioctyl sodium sulfosuccinate. The excess lactone was then decanted from the milled mixture and milling continued in a bead mill. Polyvinyl fluoride was added and the mixture milled in the bead-mill and finally sand-milled three times through a 450-mesh screen. The resultant dispersion was cast, oriented and coalesced by the general procedure described in Example XII. Details of dispersion preparation are shown in Table IV. Table V presents details of the preparation and testing of recording members prepared from these dispersions.

*Table IV*
PREPARATION OF DISPERSIONS

| Example No. | Composition | Milling Time (hrs.) | | | PVF [2] Added (g.) | Solids Content [3] of Dispersion (percent) |
| --- | --- | --- | --- | --- | --- | --- |
| | | Agate Mill | Bead-Mill [1] | | | |
| | | | Before PVF [2] Addition | After PVF [2] Addition | | |
| XVII | γ-Butyrolactone (100 g.), Chromium dioxide (5.11 g.), Dioctyl sodium Sulfosuccinate (0.05 g.) | 3 | 48 | 4 | 1.70 | 21.8 |
| XVIII | γ-Butyrolactone (100 g.), Chromium dioxide (3.18 g.), Dioctyl sodium Sulfosuccinate (0.05 g.) | 2 | 84 | 3.5 | 1.07 | 19.8 |

[1] 4 oz. jar, 20 g. ¼″ glass beads.
[2] PVF = polyvinyl fluoride.
[3] Chromium dioxide was 75% of total solids.

*Table V*
PREPARATION OF RECORDING MEMBERS

| Example No. | Doctor Knife Clearance (mils) | Magnetic Orientation Field Strength (oersteds) | | Recording Member | |
| --- | --- | --- | --- | --- | --- |
| | | A.C. | D.C. | Magnetic Component Concentration (mg./sq. in.) | Response at 1000 Cycles (db)[1] |
| XVII | 4 | 600 | 450 | [2] 2.0 | 9.2 |
| XVIII | 6 | 720 | 1,350 | [2] 3.0 | 5.5 |
| Commercial Instrumentation Tape | | | | [3] 2.6 | 3.4 |

[1] Determined as described in Example XII.
[2] Ferromagnetic chromium oxide.
[3] γ-Iron oxide.

This invention provides a process for preparing high quality ferromagnetic chromium dioxide which is readily controlled and which yields a homogeneous product.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for the preparation of ferromagnetic chromium dioxide which comprises heating an insoluble oxide of chromium, in which the average valence of chromium is greater than 4 and less than 6, in the presence of a reaction medium selected from the group consisting of water and aqueous acid, said reaction medium being present in an amount sufficient to form a fluid slurry with said oxide, at a temperature in the range of 250 to 500° C. and under a pressure in the range of 50 to 3000 atmospheres.

2. Process according to claim 1 wherein the average valence of chromium is greater than 4 and less than 5.5.

3. Process for the preparation of ferromagnetic chromium dioxide which comprises heating an insoluble oxide of chromium, in which the average valence of chromium is greater than 4 and less than 5.5, in the presence of 0.1 to 6 parts by weight per part of said oxide of a reaction medium selected from the group consisting of water and aqueous acid, at a temperature in the range of 330 to 400° C. and under a pressure in the range of 50 to 800 atmospheres.

4. Process for the preparation of ferromagnetic chromium dioxide which comprises heating, in the presence of a modifying agent, an insoluble oxide of chromium, in which the average valence of chromium is greater than 4 and less than 5.5, in the presence of 0.1 to 6 parts by weight per part of said oxide of a reaction medium selected from the group consisting of water and aqueous acid, at a temperature in the range of 250 to 500° C. and under a pressure in the range of 50 to 3000 atmospheres.

5. Process according to claim 4 wherein said modifying agent is antimony sesquioxide.

6. Process according to claim 4 wherein said modifying agent is ruthenium oxide.

7. Process according to claim 4 wherein said modifying agent is a mixture of antimony sesquioxide and ferric oxide.

8. Process for the preparation of ferromagnetic chromium dioxide which comprises heating an insoluble oxide of chromium, consisting essentially of $Cr_3O_8$, in the presence of 0.1 to 6 parts by weight per part of said oxide of a reaction medium selected from the group consisting of water and aqueous acid, at a temperature in the range of 330 to 400° C. and under a pressure in the range of 50 to 800 atmospheres.

9. Process for the preparation of ferromagnetic chromium dioxide which comprises heating an insoluble oxide of chromium, consisting essentially of $Cr_2O_5$, in the presence of 0.1 to 6 parts by weight per part of said oxide of a reaction medium selected from the group consisting of water and aqueous acid, at a temperature in the range of 330 to 400° C. and under a pressure in the range of 50 to 800 atmospheres.

10. Process for the preparation of ferromagnetic chromium dioxide which comprises heating an insoluble oxide of chromium, wherein said oxide of chromium is prepared by thermal decomposition of chromium nitrate to yield chromium of average valence of 4.1 to 5.0, in the presence of 0.1 to 6 parts by weight per part of said oxide of a reaction medium selected from the group consisting of water and aqueous acid, at a temperature in the range of 330 to 400° C. and under a pressure in the range of 50 to 800 atmospheres.

References Cited in the file of this patent

UNITED STATES PATENTS

| | | |
|---|---|---|
| 2,885,365 | Oppegard | May 5, 1959 |
| 2,923,683 | Ingraham et al. | Feb. 2, 1960 |
| 2,923,684 | Ingraham | Feb. 2, 1960 |
| 2,923,685 | Swoboda | Feb. 2, 1960 |
| 2,956,955 | Arthur | Oct. 18, 1960 |

OTHER REFERENCES

Mellor: "Comprehensive Treatise on Inorganic and Theoretical Chemistry," Longmans, Green and Co., New York, 1931, pages 206 to 210 (vol. 11).